Dec. 25, 1951  H. P. PHILLIPS  2,579,697
PISTON RING ASSEMBLY AND ELEMENT
Filed Sept. 17, 1947
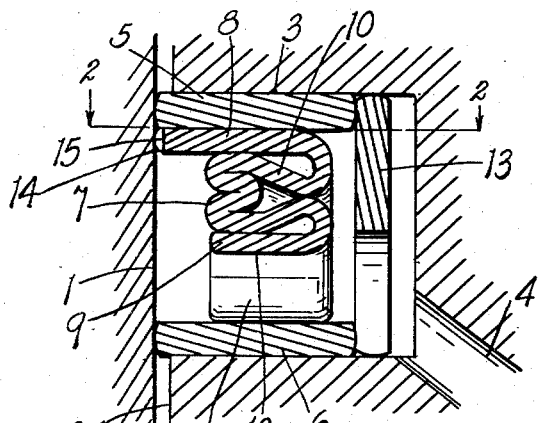
FIG. 1
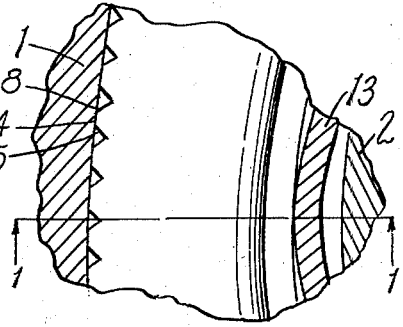
FIG. 2
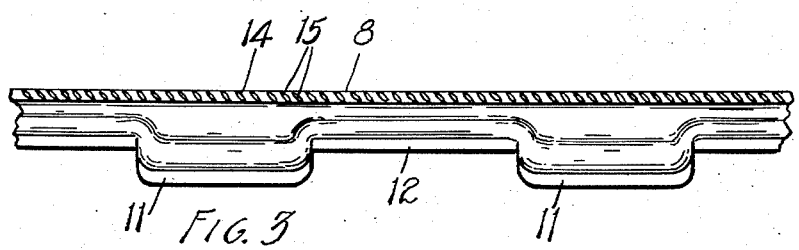
FIG. 3
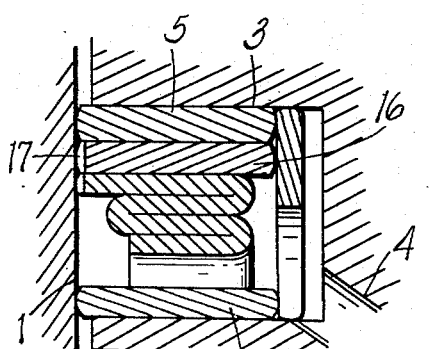
FIG. 6
FIG. 5
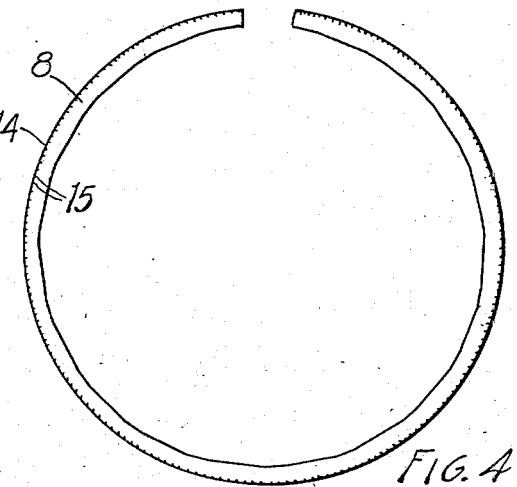
FIG. 4
INVENTOR.
Harold P. Phillips
BY
Attorney.

Patented Dec. 25, 1951

2,579,697

UNITED STATES PATENT OFFICE 2,579,697

PISTON RING ASSEMBLY AND ELEMENT

Harold P. Phillips, Hastings, Mich., assignor to Hastings Manufacturing Company, Hastings, Mich.

Application September 17, 1947, Serial No. 774,579

6 Claims. (Cl. 309—45)

This invention relates to improvements in piston ring assembly and element.

The main objects of this invention are:

First, to provide a piston ring assembly which is highly efficient and at the same time is effective in preventing or minimizing scuffing during the wearing in period.

Second, to provide a piston ring assembly which, while effective in controlling lubricant provides desired lubrication of the cylinder wall and the ring elements during the wearing in period.

Third, to provide a piston ring assembly including a spacer having a cylinder wall engaging portion, which spacer serves as an effective lubricant carrier during the initial or wearing in period of the ring assembly, the lubricant carrying feature of the spacer element being eliminated with the wearing in of the element and the associated ring parts or members.

Fourth, to provide a spacer element having these advantages which may be very economically produced.

Further objects relating to details and economies of the invention will appear in the description to follow. The invention is defined and pointed out in the claims.

A preferred embodiment of the invention is illustrated in the accompanying drawing, in which:

Fig. 1 is an enlarged fragmentary section of a piston ring assembly embodying my invention. On a line 1—1 of Fig. 2 showing the assembly installed in the oil ring groove of a piston, the piston and associated cylinder parts being shown conventionally and without regard to dimensions and clearances, the piston ring member or element being also shown enlarged and without regard to dimensions.

Fig. 2 is a fragmentray sectional view of line 2—2 on Fig. 1.

Fig. 3 is a fragmentary peripheral or face view of the spacer element.

Fig. 4 is a side elevation thereof, viewed from the top of Fig. 3.

Fig. 5 is an enlarged fragmentary edge view of the spacer further illustrating the serrations in the cylinder engaging edge thereof.

Fig. 6 is a fragmentary sectional view corresponding to that of Fig. 1 of a modified form of my invention as shown in the accompanying drawings.

I have not attempted to show parts in relative dimensions or clearances for it is understood that the dimensions of the piston ring assembly elements vary considerably with the size of the ring.

Referring to the accompanying drawing 1 represents a cylinder and 2 a piston having a piston ring groove 3 and provided with a drain opening 4.

A piston ring assembly of the embodiment shown in Figs. 1 and 2 comprises the upper and lower thin split annular expansible cylinder wall engaging elements 5 and 6, these are preferably formed of ribbon steel coiled edgewise and they are desirably flat as illustrated and may be of .020 to .032 of an inch in thickness, this range, however, may be exceeded in either direction for particular ring structure. The spacer member designated generally by the numeral 7 is similar to that of my Patent No. 2,404,862, issued July 30, 1946, in that it is formed of a strip of ductile metal folded longitudinally upon itself and coiled into an annular split element and folds providing a cylinder wall engaging flange like portion 8 and a lower side portion 9 with intermediate folds 10, the lower and intermediate portions being upset to provide spacing reaches 11 and alternating drain reaches 12. The elements 5 and 6 are urged yieldingly outward by the inner or expander ring 13, this expander does not engage the spacer member in the embodiments illustrated. The spacer member may be formed of stock varying considerably in thickness but it should be sufficiently ductile to permit the folding and coiling and may be what is commonly known as "dead soft steel." The stock may vary considerably in gauge for example .007 to .0030 and desirably may be formed of .010 to .020.

The periphery or cylinder engaging edge 14 of the spacer member is knurled or provided with transverse serrations 15 extending in a general axially direction, or axially of the member 8, the recesses formed by this knurling or serrations may desirably be of .003 to .005 in depth but the range may with quite satisfactory results be from .002 to .008, and while they are desirably uniform in depth throughout the periphery, there may be considerable variations. The recesses form lubricant pockets which carry lubricant to the cylinder and the other piston ring elements during the initial or break in period and the knurled edge also has a tendency to break up the glaze commonly found on worn cylinders. The minute pockets hold the oil by capillary attraction during the break in period or until the knurl or serrations are worn off. The member having the serrated edge is disposed in side by side supporting relation to the upper ring element 5 and the knurled or serrated edge allows oil to be metered pass the spacer quite uniformly all around the ring, this oil is trapped just below the element 5 where it is available for lubrication at all points around the circumference of the ring. The oil is thus carried as high up as possible without excess oil consumption, the result is improved cylinder and ring lubrication during the breaking in period and the substantial elimination of scuffing during this period with resulting full oil control after the knurl or serrations have been worn off the element.

In the embodiment shown in Fig. 6 a fourth ring element 16 is provided, this being a duplicate of the elements 5 and 6 with the exception that it has a knurled or serrated cylinder wall engaging edge 17. While I have illustrated in Fig. 6 the use of the element 16 with the spacer of my present invention another form of spacer might be used, such for example that shown in my Patent No. 2,310,311 issued February 9, 1943, the assembly illustrated, however, is a highly desirable one.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described my invention, what I claim as new and desire to secure by Letters Patent is:

1. A piston ring assembly comprising upper and lower thin split flat annular expansible cylinder wall engaging side elements provided with continuous cylinder wall engaging edges from end to end thereof, and an annular split expansible intermediate element formed of ductile material folded longitudinally upon itself to provide a plurality of radially disposed outer and intermediate plies the upper of the plies being flat and of greater radial width than the remaining plies and constituting a cylinder wall engaging member disposed in side by side relation to the upper side element and having a serrated cylinder wall engaging edge coacting with the upper side member in providing lubricant pockets during the initial wearing in of the assembly, the other plies being axially conformed to provide alternate spacer reaches and drain reaches, the serrations of said cylinder wall engaging edge of the upper ply being inclined and extending from the bottom of said upper ply to the top thereof, to provide oil passageways from beneath said upper ply to below the cylinder wall engaging edge of the upper side element, said passageways being relatively narrow and relatively closely circumferentially spaced around the entire circumference of said cylinder wall engaging edge of the upper ply to provide by passage of oil therethrough a substantially continuous pocket of oil beneath and around the entire circumference of the upper of said cylinder wall engaging side elements, said serrations being of a radial depth to permit the same to be substantially entirely worn away during the initial wear-in period of the assembly.

2. A piston ring assembly comprising an upper split annular expansible cylinder wall engaging side element provided with a continuous cylinder wall engaging edge from end to end of the element, and an annular split expansible spacer element formed of ductile material folded longitudinally upon itself to provide a plurality of radially disposed outer and intermediate plies, the upper of the plies being flat and constituting a cylinder wall engaging member disposed in side by side relation to the upper side element and having a serrated cylinder wall engaging edge providing a multiplicity of lubricated pockets during the initial wearing in of the assembly, the other plies being axially conformed to provide alternate spacer reaches and drain reaches, the serrations of said cylinder wall engaging edge of the upper ply being inclined and extending from the bottom of said upper ply to the top thereof, to provide oil passageways from beneath said upper ply to below the cylinder wall engaging edge of the upper side element, said passageways being relatively narrow and relatively closely circumferentially spaced around the entire circumference of the cylinder wall engaging edge of the upper ply to provide by passage of oil therethrough a substantially continuous pocket of oil beneath and around the entire circumference of said cylinder wall engaging side element, said serrations being of a radial depth to permit the same being substantially entirely worn away during the initial wear-in period of the assembly.

3. A piston ring assembly comprising a pair of cylinder wall engaging segments provided with continuous cylinder wall engaging edges from end to end thereof, and an expansible spacer therefor formed of a strip of ductile metal and having an annular radially extending cylinder wall engaging flange disposed in side by side supporting engagement with the upper of the ring segments, the cylinder wall engaging flange of said spacer having a finely serrated periphery providing a multiplicity of lubricant pockets during the wearing in period of the assembly and facilitating the wearing in thereof, the serrations of said flanges being inclined and extending from the bottom of the flange to the top thereof beneath the cylinder wall engaging edge of the top segment to provide oil passageways from beneath said flange to said edge of the top segment, the serrations being relatively closely spaced around the entire periphery of said flange to provide a substantially continuous pocket of oil beneath and around the entire periphery of upper ring segment, said serrations being of radial depth to permit the same being substantially entirely worn away during the initial wear-in period of the ring assembly.

4. A piston ring assembly comprising an outer thin split expansible cylinder wall engaging element and a coacting thin split inner element disposed at the inner side of and in side by side relation to the outer element, said outer element being provided with a continuous cylinder wall engaging edge from end to end of the element, said inner element having a serrated cylinder wall engaging periphery providing a plurality of lubricant pockets facilitating the wearing in of the assembly, the serrations of said inner element providing inclined oil passageways extending from the inner side thereof to the opposite side thereof adjacent the outer element, said passageways being relatively closely spaced around the entire circumference of the cylinder wall engaging edge of the inner element to provide by passage of oil therethrough a substantially continuous pocket of oil on the inner side of the outer element adjacent the cylinder wall engaging edge thereof and around the entire circumferences of such edge, said serrations being of a radial depth to permit the same to be substantially entirely worn away during the initial wear-in period of the assembly.

5. A piston ring assembly comprising an outer split expansible cylinder wall engaging element and an inner split expansible cylinder wall engaging element disposed at the inner side of the outer element in side by side relation thereto, the inner element having a serrated periphery, the serrations providing recesses therebetween axially disposed and of a depth of approximately .002 to .008 of an inch, the recesses extending entirely across said periphery to provide oil passageways from the inner side of the inner element to the opposite side thereof adjacent the outer element, said axially disposed recesses being relatively closely circumferentially spaced around the entire circumference of the cylinder wall engaging edge of the inner element to provide by passage of oil therethrough a substantially continuous pocket of oil on the inner side of the outer element adjacent the cylinder wall engaging edge thereof and around the entire circumference of such edge.

6. A thin split expansible cylinder wall engaging piston ring element having a serrated cylinder wall engaging periphery facilitating the wearing in of the element and providing passageways for passage of oil from one side thereof to the opposite side thereof during such wearing in, the passageways being disposed axially and being of a depth of approximately .002 to .008 of an inch and all being disposed substantially parallel to each other and extending entirely across said periphery, said passageways being relatively closely circumferentially spaced around the entire circumference of the cylinder wall engaging periphery of the ring element to provide by passage of oil therethrough a substantially continuous pocket of oil around the entire cylinder wall engaging edge of an adjacent ring element during the wear-in period of said adjacent element.

HAROLD P. PHILLIPS.

REFERENCES CITED

The following references are of record in the file of this patent:

UNITED STATES PATENTS

| Number | Name | Date |
|---|---|---|
| 1,401,930 | Wainwright | Dec. 27, 1921 |
| 1,477,120 | Hanson | Dec. 11, 1923 |
| 1,613,410 | Post | Jan. 4, 1927 |
| 1,677,158 | Wenzel | July 17, 1928 |
| 1,830,841 | Koether | Nov. 10, 1931 |
| 2,030,927 | Marien | Feb. 18, 1936 |
| 2,262,311 | Zahodiakin | Nov. 11, 1941 |
| 2,404,862 | Phillips | July 30, 1946 |